June 16, 1931. L. L. GRAY 1,810,826
GREASE SERVICE RACK
Filed Jan. 20, 1931 2 Sheets-Sheet 2
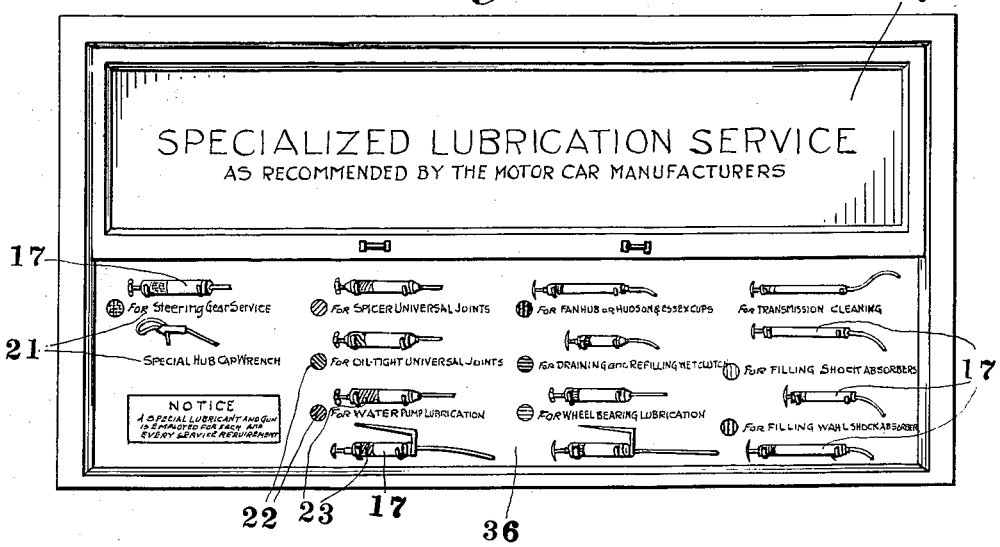
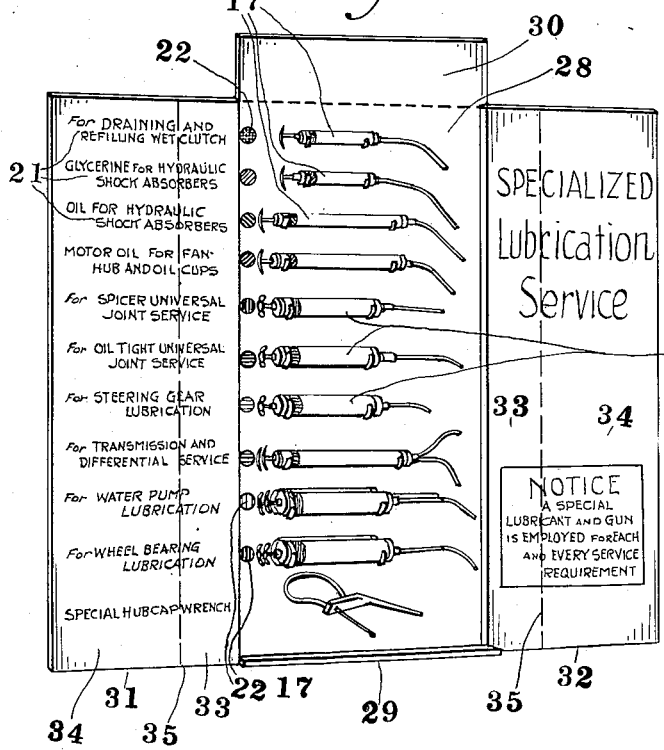
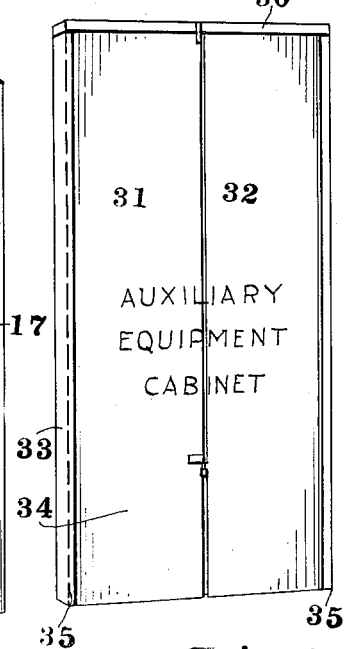
Inventor
LEIL L. GRAY Patented June 16, 1931

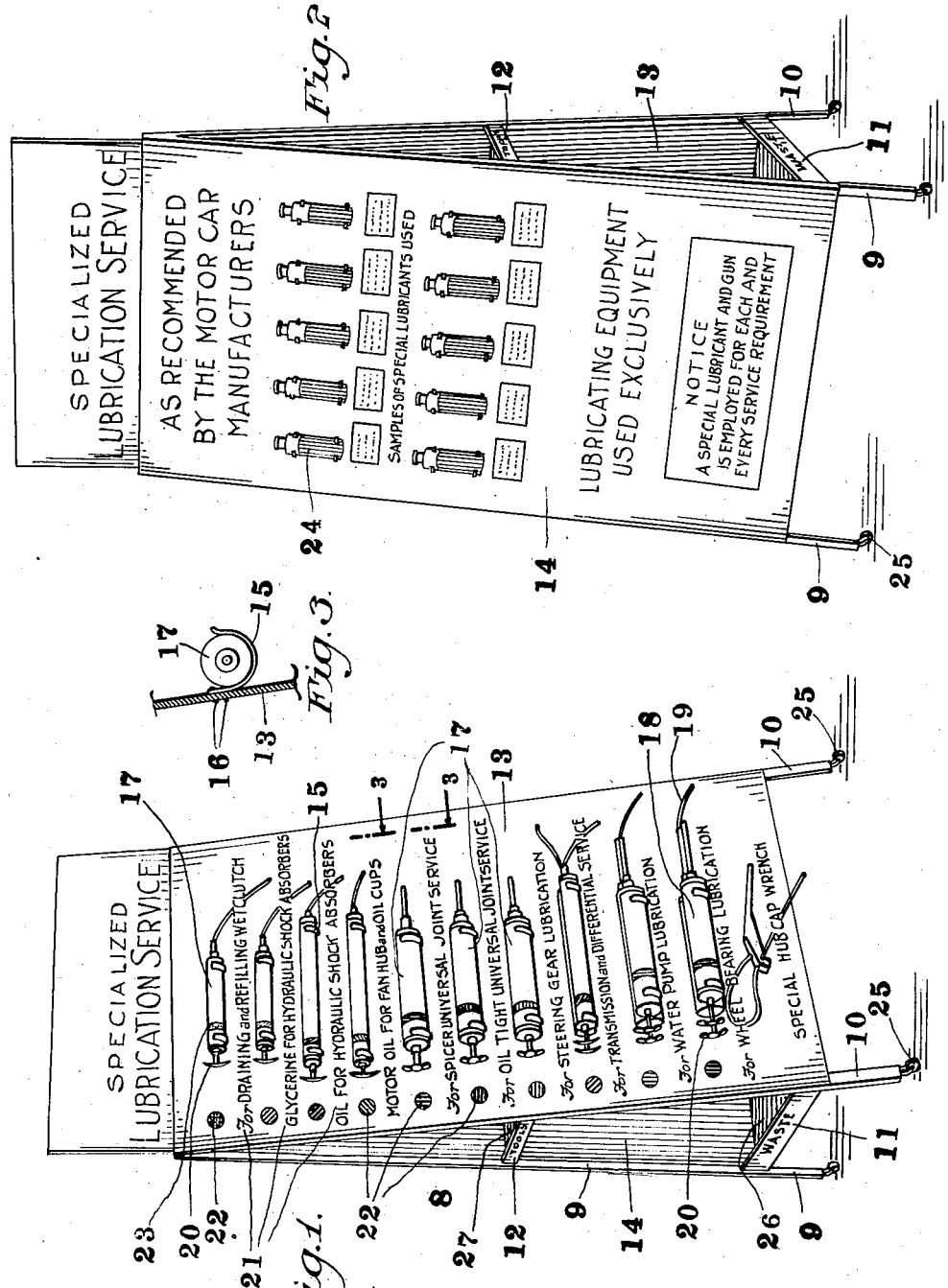

1,810,826

UNITED STATES PATENT OFFICE

LEIL L. GRAY, OF MINNEAPOLIS, MINNESOTA

GREASE SERVICE RACK

Application filed January 20, 1931. Serial No. 509,916.

My invention relates to a new and useful grease service rack particularly adapted for specialized lubrication.

In the complete lubrication of automobiles, a number of distinctly different lubricants are required for the various moving parts which require lubrication periodically. To effect a certain degree of efficiency in the lubrication of automobiles, particularly in the application of the several different specialized lubricants, these lubricants must be filled into separate and distinct grease dispensing pumps or grease guns, from which the respective specialized lubricants may be applied to the various parts requiring such specialized lubrication.

It is the object of my present invention to provide means whereby a series of generally similar grease dispensing pumps or grease guns, each containing a different specialized lubricant or other fluid required in the servicing of the automobile, may be arranged and kept at hand so that they may be used with the greatest facility, and so that the danger of confusion of the various lubricants is reduced to a minimum. Thus, it is an object of my invention to reduce to a minimum the possibility of applying to any part of the automobile requiring specialized lubrication or requiring some fluid for specialized servicing, any fluid or lubricant other than the appropriate fluid or lubricant required for the particular part, and at the same time to facilitate the quick and easy selection of the required lubricant or other fluid.

With the above and other objects in view which will appear more fully from the following detailed description, my invention consists of a novel specialized lubricant rack carrying a series of similar brackets, a series of dispensing pumps or "guns" adapted to be removably mounted upon said brackets, an individual mark of identification on each gun and a corresponding mark of identification on said rack in juxtaposition to the corresponding bracket, and a legend or other indicia carried by said rack in juxtaposition to each bracket denoting a particular part of the automobile requiring the specialized lubrication or other specialized service.

My invention further consists of other novel features of construction which will appear more fully from the following detailed description.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts:

Figure 1 represents a perspective view of the front of a novel lubricant service rack embodying my invention.

Figure 2 represents a perspective view of the rear of said lubricant service rack.

Figure 3 represents a section (on an enlarged scale) on line 3—3 of Figure 1.

Figure 4 represents a perspective view of a lubricant service rack of a modified construction embodying my invention shown in the open position.

Figure 5 represents a perspective view of the lubricant service rack of the modified construction shown in Figure 4;—shown, however, in the closed condition.

Figure 6 represents a lubricant service rack of a further modified construction, embodying my invention, shown in the open position.

In the embodiment of my invention as shown particularly in Figures 1 and 2, I provide a rack 8 which may be moved about from place to place, if so desired. The rack 8 is formed of pairs of suitable generally upright frame members 9 and 10 respectively, converging towards each other and being united to each other at their upper ends.

The pairs of inclined or converging upright members 9 and 10 may be held together near their lower ends by suitable transverse frame members 11, and if desired, intermediate transverse frame members 12 may also be provided. Upon the front upright frame members 10, the front panel 13 is mounted;—with the lower ends of said frame members 10 projecting below the panel 13 to a suitable extent so as to form legs.

On the rear upright frame members, a corresponding rear panel 14 is mounted in a similar way. If desired, suitable frame members (not shown) may also be interposed between the pair of parallel upright frame members 10 and also between the pair of parallel upright frame members 9, thereby to reinforce the panels 13 and 14 and so as to increase the rigidity of the rack in its entirety. Upon the front panel 13, pairs of suitable brackets 15 are provided, permanently secured to the panel by suitable screws or rivets 16, or the like. The two brackets 15 of each pair are arranged in generally horizontal alignment with each other and are spaced apart from each other to a suitable extent to accommodate the lubricant or other fluid dispensing gun or pump 17 in a generally horizontal position. The successive pairs of brackets 15 are preferably arranged above each other as will be seen particularly in Figure 1. By reason of the generally horizontal positioning of the pumps 17, leakage or escape of lubricant (or other fluid) is minimized while pumps are not in use. This is not only conducive to a desirable degree of cleanliness, but also results in a saving of lubricant. The reason why the horizontal positioning of the pumps results in these added advantages, is because it prevents the pump handles and piston rods from being retracted or drawn out by force of gravity, and, alternatively, because it tends to prevent the drippage of lubricant from the discharge nozzles of the pumps.

The brackets 15 are in the form of open clips without anything to grip, clamp or lock the pump in position, and so arranged that the pumps may be replaced upon the service rack or panel by approaching the brackets or clips 15 generally from above. This tends to facilitate the handling of the pump because the latter may be removed from and replaced upon the service rack most quickly and without the operator having to overcome any resistance due to spring, or other, gripping, clamping, retaining or locking means.

The lubricant or other fluid dispensing pumps or "guns" 17 may be of any suitable construction including a cylinder 18, a discharge nozzle pipe or orifice 19, a handle 20 and means within said cylinder and operable by means of said handle for ejecting the lubricant or other fluid from said cylinder.

In operative juxtaposition or relation to each pair of brackets 15, a suitable legend or other suitable indicia 21 are provided on the panel 13, to denote the particular automobile part requiring specialized lubrication.

Also in juxtaposition to each pair of brackets 15, a suitable identification mark 22 is provided on the panel;—said identification mark being either in the form of a color mark or other suitable mark. Upon the corresponding lubricant or other fluid dispensing pump 17, filled with the specialized lubricant or other fluid required for the part of the automobile denoted by the corresponding legend or other indicia, a similar identification mark 23 is provided. Thus, the successive identification marks 22 on the panel 13 may be suitable colored areas of distinctly different colors, and corresponding colored areas 23 may be provided on the cylinder portions 18, or upon any other suitable portions, such as the handle portions 20 of the lubricant or fluid dispensing pumps 17. The various cross-sections used in the drawings are intended to indicate various distinctly different colors.

By this means, not only is the selection of the particular dispensing pump 17 containing the particular desired lubricant or other fluid greatly facilitated, but subsequent confusion or mis-selection of lubricant or other fluid is avoided, or the possibility of such confusion or mis-selection is reduced to a minimum, because in replacing the dispensing pumps, the operator is guided by the color mark on the dispensing pump and the color mark on the rack panel, so that the dispensing pump may be replaced in juxtaposition to the appropriate legend other suitable indicium 21, so that it may not be subsequently mis-selected and its contents misapplied to some part of the automobile requiring a different lubricant or other fluid.

On the rear panel 14 of the floor type rack shown in Figures 1 and 2, a bottle sample 24 may be mounted, of the several different lubricants or other fluids contained in the pumps 17 on the front panel 13, so that the contents of the pumps may be checked at any time.

In order to facilitate the moving of the floor type of lubricant service rack shown in Figures 1 and 2, suitable castors or other wheels 25 may be provided on the lower ends of the upright frame members 9 and 10.

If desired also, suitable shelves 26 and 27 may be provided between the front and rear panels 13 and 14, for the reception of waste and for tools required in the lubrication.

In Figures 4 to 6 inclusive, I have illustrated modified embodiments of my invention in the form of wall type of lubricant service racks adapted to be mounted upon any suitable wall or the like.

In the modification shown in Figures 4 and 5, the pump supporting panel 28 is mounted upon the wall, and below it a suitable slight horizontal bottom wall member 29 is provided. To the upper edge of the pump panel 28, a corresponding upper lid or closure member 30 is hingedly secured. To the two vertical edges of the panel 28, the articulated side panels 31 and 32 are hingedly secured;—each of said side panels being formed of a narrow section 33 and a wider section 34 hingedly secured to each other along the line 35, so that when the panels 31 and 32 are folded over, they constitute both the side walls as well as the front doors of a completely closed cabinet;—the upper panel 30 being folded down to form the upper closure or wall of said cabinet. By this means, the pumps mounted upon the panel 28 may be completely enclosed and locked, if desired, by any suitable locking means, such as a padlock, bolt, or the like. In this modification of my present invention, the legend or other indicia 21, denoting the particular automobile part, are provided on one of the side panels, such as the side panel 31, while the central panel 28 merely carries the brackets, the pumps and the identifying color marks 22. In the embodiment of my invention shown in Figure 6, the pump supporting panel 36 is the rear wall of a suitable cabinet provided with a vertically sliding door 37, whereby said cabinet may be closed. This embodiment of my invention, is likewise of the wall type, the pump panel 36 also bearing the legends 21.

In the operation and use of the novel lubricant service racks of my present invention, the various dispensing pumps 17 are filled with the various specialized lubricants or other specialized fluid required in the servicing of an automobile, and the pumps are then placed upon the rack, upon the brackets in juxtaposition to the particular legend or other suitable indicium denoting or indicating the part of the automobile requiring that particular lubricant or other fluid. The dispensing pumps 17 are then selected and removed from the rack by the operator as he reaches the successive parts of the automobile requiring lubrication, lubricating or servicing. When the lubrication or servicing of that particular part of the automobile is completed, the operator returns the particular dispensing pump 17 to the rack, replacing it according to the color marks or other suitable marks 23 on the pump and the corresponding marks 22 upon the panel 13. By this means, the possibility of confusion is avoided and the possibility of a mis-selection and mis-application of lubricants is reduced to a minimum so that the use of the appropriate lubricant for each part is assured.

The importance and advantage of my novel lubricant service rack is most apparent in the operation of automobile service stations, particularly those which are required to handle a large volume of lubrication business, and where a number of operators use the same set of equipment or dispensing pumps. In such an instance, not only is the efficiency of the specialized lubrication operations greatly increased, and the time of the operators materially conserved, but the possibility of mistake is reduced to a minimum.

I am aware that my invention may be embodied in other specific forms without departing from the spirit or essential attributes thereof, and I therefore desire the present embodiments to be considered in all respects as illustrative and not restrictive, reference being had to the appended claims, rather than to the foregoing description to indicate the scope of the invention.

Having thus described my invention, what I hereby claim as new and desire to secure by Letters Patent, is:—

1. A specialized lubricating service rack including a series of pump supports, for receiving a series of pumps containing different fluids, a corresponding series of dispensing pumps mounted upon said supports, a series of indicia upon said rack in juxtaposition to said series of pump supports, respectively, each indicating a particular part of the automobile requiring a specialized lubrication or service and a series of identification marks upon said pumps, and a corresponding series of identification marks upon said rack in juxtaposition to said pump supports, for identifying each with its particular support and hence with the particular legend denoting the part of the automobile to which said pump is properly applicable.

2. A specialized lubricating service rack including a series of pump supports, for receiving a series of pumps containing different fluids, a corresponding series of dispensing pumps mounted upon said supports, a series of legends upon said rack in juxtaposition to said series of pump supports, respectively, each indicating a particular part of the automobile requiring a specialized lubrication or service and a series of identification marks upon said pumps, a corresponding series of identification marks upon said rack in juxtaposition to said pump supports, for identifying each with its particular support and hence with the particular legend denoting the part of the automobile to which said pump is properly applicable, and means for completely enclosing said pumps upon said rack, when not in use.

3. A specialized lubricating service rack including a series of pump supports, for receiving a series of pumps containing different lubricants, a corresponding series of dispensing pumps mounted upon said supports, a series of legends upon said rack in juxtaposition to said series of pump supports, respectively, each indicating a particular part of the automobile requiring a specialized lubrication or service and a series of identification marks upon said pumps, a corresponding series of identification marks upon said rack in juxtaposition to said pump supports, for identifying each with its particular support and hence with the particular legend denoting the part of the automobile to which said pump is properly applicable, and a shelf carried by said rack for receiving tools or waste.

4. A specialized lubrication service rack, including a series of pump supports for receiving a series of pumps containing different fluids required in servicing an automobile, and corresponding series of dispensing pumps mounted upon said supports, each containing one of said series of different lubricants or other fluids, a series of identification marks on said pumps and a corresponding series of identification marks upon said rack in juxtaposition to said pump supports, for identifying each pump with its particular support.

5. A specialized lubrication service rack including a series of dispensing device supports, for receiving a series of dispensing devices containing a series of different fluids required in the servicing of machinery, a corresponding series of dispensing devices mounted upon said supports, containing said different fluids, a series of marks corresponding to said series of dispensing device supports and a series of marks upon said series of dispensing devices, respectively, corresponding to the respective fluids contained within said dispensing devices.

6. A specialized lubrication service rack, including a series of dispensing pump supports for receiving a series of dispensing pumps containing different lubricants or other fluids required in servicing an automobile, said supports being adapted to support said dispensing pumps in a generally horizontal position, a corresponding series of dispensing pumps detachably mounted upon said supports in generally horizontal positions, each containing one of said series of different lubricants or other fluids, and identifying means carried by the rack in operative relation to said pumps, including a series of markings, and indicia in operative relation to rack and pumps, indicating respectively a corresponding series of automobile parts requiring specialized lubrication, for guiding the operator in the proper application of each dispensing pump to the respective part of the automobile requiring the particular lubricant contained within the particular pump.

7. A specialized lubrication service system, including a series of dispensing pump supports for receiving a series of dispensing pumps containing different lubricant or other fluids required in servicing an automobile, said pump supports being adapted to support said dispensing pumps in a generally horizontal position, a corresponding series of dispensing pumps detachably mounted upon said supports in a generally horizontal position, each containing one of said series of different lubricants or other fluids, a corresponding series of indicia, denoting or indicating respectively a corresponding series of automobile parts requiring the specialized lubrication, a series of characteristic markings upon said series of dispensing pumps, and a corresponding series of markings disposed in operative relation to said series of indicia.

8. A specialized lubricating service system, including a series of pump supports, for receiving a series of pumps containing different lubricants or other fluids, a corresponding series of dispensing pumps detachably mounted upon said supports, a series of indicia disposed in operative relation to said series of pump supports, respectively indicating a particular part of the automobile requiring a specialized lubrication or service, and identification means including means carried by the pumps to facilitate the replacement of said pumps upon their respective supports in juxtaposition to their respective indicia for indentifying said pumps with the particular part of the automobile to which they are properly applicable.

9. A specialized lubrication service rack disposed in a generally upright position, including a series of dispensing pump supports for receiving a series of dispensing pumps containing different lubricants or other fluids required in servicing an automobile, said supports comprising open brackets having upwardly inclined free ends and being adapted to support said dispensing pumps in generally horizontal positions, a corresponding series of dispensing pumps detachably mounted upon said supports in generally horizontal positions, each containing one of said series of different lubricants or other fluids, and identifying means carried by said rack in operative relation to said pumps, comprising a series of markings, and indicia in operative relation to rack and pumps, indicating respectively a corresponding series of automobile parts requiring specialized lubrication, for guiding the operator in the proper application of each dispensing pump to the respective part of the automobile requiring the particular lubricant contained within the particular pump.

10. A specialized lubrication service panel, including a series of dispensing pumps, supports for receiving a series of dispensing pumps containing different lubricants or other fluids required in servicing an automobile, a corresponding series of dispensing pumps detachably mounted upon said supports, each containing one of said series of different lubricants or other fluids, and identifying means carried by said panel in operative relation to said pumps, including a series of identifying markings, and indicia in operative relation to panel and pumps, indicating respectively a corresponding series of automobile parts requiring specialized lubrication, for guiding the operator in the proper application of each dispensing pump to the respective part of the automobile requiring the particular lubricant contained within the particular pump.

11. A specialized lubrication service rack disposed in a generally upright position, including a series of dispensing pump supports for receiving a series of dispensing pumps containing different lubricants or other fluids required in servicing an automobile, a corresponding series of dispensing pumps detachably mounted upon said supports each containing one of said series of different lubricants or other fluids, and identifying means carried by said rack in operative relation to said pumps, comprising a series of identifying markings, and indicia in operative relation to rack and pumps indicating respectively a corresponding series of automobile parts requiring specialized lubrication, for guiding the operator in the proper application of each dispensing pump to the respective part of the automobile requiring the particular lubricant contained within the particular pump.

In testimony whereof, I have hereunto set my hand this 12th day of January, 1931.

LEIL L. GRAY.